Patented Dec. 28, 1926.

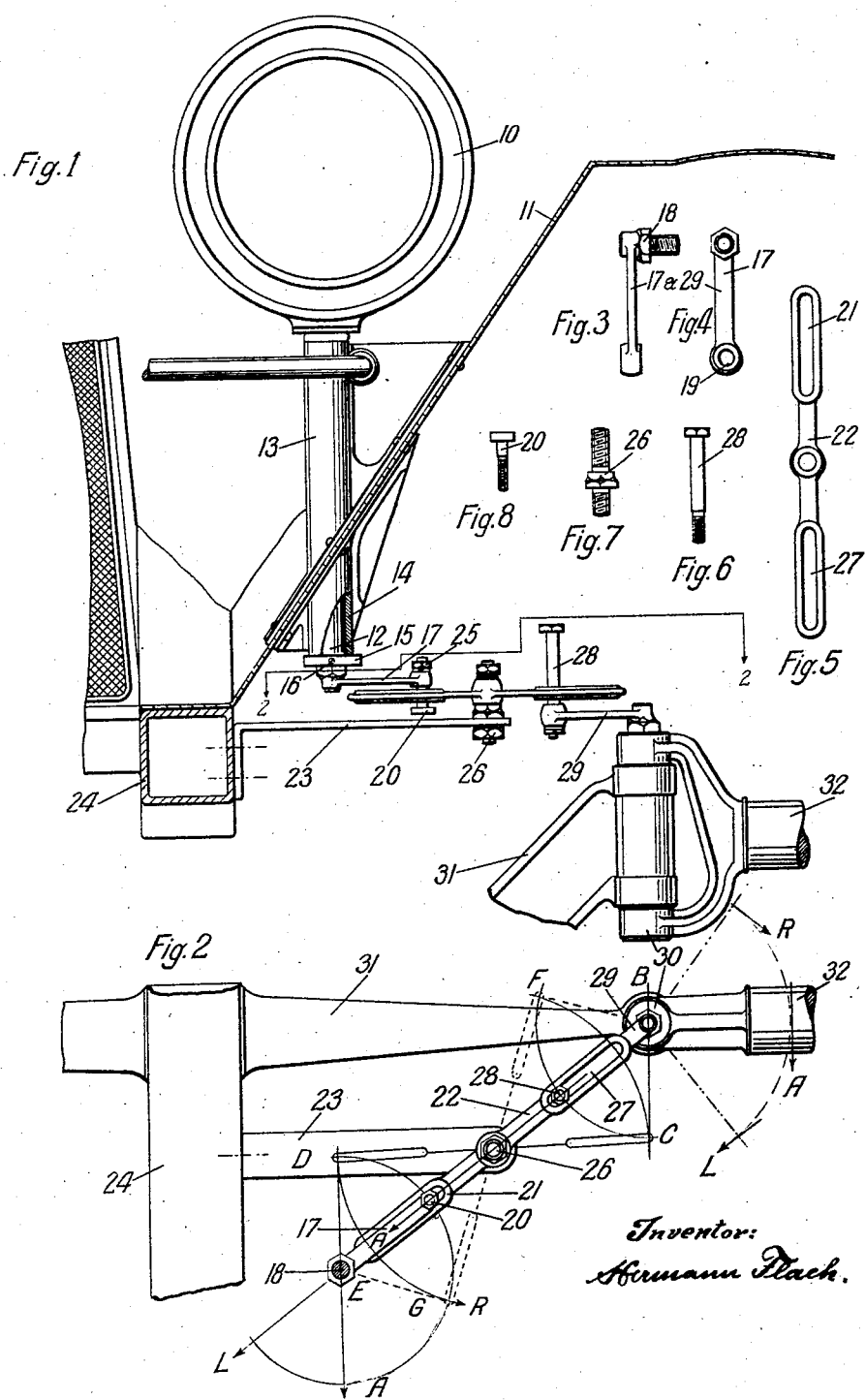

1,612,503

UNITED STATES PATENT OFFICE.

HERMANN FLACH, OF CALUMET CITY, ILLINOIS.

HEADLIGHT FOR AUTOMOBILES.

Application filed December 23, 1925. Serial No. 77,293.

The invention relates to lamps for vehicles and more especially to head lights for automobiles.

The object of the invention is to provide a headlight for automobiles located at the usual place for such head lights and adapted to be moved in unison with the front or steering wheels of the automobile, when said wheels are actuated for steering purposes in a well known manner by steering devices for any known and suitable type.

A further object of the invention is to provide a head light for automobiles adapted to be so actuated, that the axis of the light cone produced by said head light will at all times lie in the same vertical plane, in which the corresponding wheel rotates.

A further object of the invention is to provide a head light for automobiles adapted to throw the light emanating from said head light at all times directly in front of the corresponding front wheel, no matter if the automobile is driven straight or is going into a curve.

A still further object of the invention is to provide a head light for an automobile, which is connected to the front wheels of the automobile in such a manner, that the head light will follow the least deviation of the front wheels of the automobile from the driving direction, whereby a driver or pedestrian going in the opposite direction is enabled to recognized an unsafe driver and can act accordingly to protect himself against an accident.

With these and other objects not specifically mentioned in view, the invention consists in certain combinations, constructions and parts, which will be hereinafter fully described and then specifically pointed out in the claims hereunto appended.

In the accompanying drawings, which form a part of this specification and in which like characters of reference indicate like parts—

Fig. 1 is a front view of a head light according to the present invention, shown in connection with an automobile whereof only a part is shown, certain parts being broken and in section.

Fig. 2 is a sectional plan view substantially on line 2—2 in Fig. 1, different positions of certain parts being indicated in dotted and in light lines.

Figs. 3, 4, 5, 6, 7 and 8 are detail views of the parts connecting the head light with the pivot bolt of the front wheel.

The head light 10 may be of any known and desired construction, but instead of being connected rigidly with the mud guard 11 of the front wheel (not shown) the head light is rotatably supported thereby.

For this purpose a stud 12 is rigidly connected to the bottom of the head light 10 and extends through a tubular guide riveted to the upper face of the mud guard and through another tubular guide 14, also riveted to the mud guard and registering with the first mentioned tubular guide, the mud guard being provided with an aperture (not shown) registering with both guides. A collar 15 detachably fastened to the stud 12 by means of a set screw secures said stud against longitudinal movement, but permits rotary movement of said stud in the tubular guides.

A lever 17 is at one of its ends rigidly connected with a bolt 18. The stud 12 is provided at its lower end with a female thread adapted to receive the bolt 18, so that any pivoted movement of the lever 17 will cause the stud 12 and thereby also the head light 10 to rotate. At its free end the lever 17 is provided with an aperture 19 adapted to receive a bolt 20. This bolt 20 extends slidably through a longitudinal slot 21 of a lever 22 pivotally supported intermediate of its ends on a bracket 23 fastened to the frame 24 of the automobile.

A nut 25 on the bolt 20 holds the lever 17 in operative connection with the lever 22.

A double bolt 26 is rigidly but detachably connected to the bracket 23 and pivotally supports the lever 22. This lever has a second longitudinal slot 27 adapted to slidably receive a bolt 28. The lower part of this bolt extends through an aperture in a lever 29 shaped exactly like the lever 17. The bolt 28 is, as is clearly shown in the drawing, comparatively long for a purpose to be explained later on. The bolt 18 on the lever 29 is screwed into the pivot bolt 30 provided for this purpose with a female thread (not shown) at its upper end. The pivot is in a well known manner, rotatably carried by the front axle 31 and carries in turn the spindle 32 of the front wheel (not shown).

The steering apparatus is not a part of the present invention and is therefore neither shown nor described. It will, however, be clear, that, when the pivot bolt 30 is rotated for steering purposes the lever 29 will be swung out with the pivot bolt and will actuate the lever 22, which in turn will swing out the lever 17 and thereby rotate the head light, so that any change in the driving direction will immediately change the position of the head light relative to the automobile body in the same degree as the position of the front wheel in relation to the body was changed.

The bolt 28 is comparatively long in order to prevent the transfer of any feathering up and down motion of the front axle, which supports the pivot bolt 30, lever 29 and bolt 28 to be transmitted to the slotted lever 22.

In Figure 2 the relative positions of the levers, the front wheel and the head light are indicated 1st, when the automobile travels straight ahead, 2nd if a right turn and 3rd when a left turn is being made. The arrows marked "A" indicate the positions of the different parts in the first case; the lines B, C, D, E the position of the levers in case 2 and the arrows marked "R" the position of the front wheel and head light in the same case. Arrows "L" indicate the position of the front wheel and head light in the third case and the lines B, F, G, E the position of the levers in the third case.

It will be clear from the above description, that any change in the driving direction will immediately be transferred to the head lights, whereby a driver or a pedestrian going in the opposite direction will immediately be notified of the intention of the first driver to make a turn.

What I claim as new and wish to secure by Letters Patent is:

1. In a headlight of the class described, a stud rigidly connected with the headlight and rotatably carried by a part rigidly connected to the automobile body, a lever rigidly connected to the stud, a second lever rigidly connected to the pivot bolt of the steering wheel of the automobile, a third lever arranged between the two first mentioned levers and pivotally supported between its ends by the frame of the automobile and means for movably connecting the third lever with the first and second lever respectively.

2. In a head light of the class described, a stud rigidly connected to the head light and rotatably supported by the automobile body, a lever rigidly but detachably connected with said stud, a second lever rigidly but detachably connected to the pivot bolt of the front wheel of the automobile, a third lever arranged between the two first mentioned levers and pivotally supported between its ends by the frame of the automobile, and means for movably connecting the third lever with the first and second lever respectively.

3. In a head light of the class described, a stud rigidly connected to the headlight, a tubular guide on the automobile body receiving and rotatably supporting the stud, a bracket on the frame of the automobile, a lever rotatably supported between its ends by the bracket, means operatively connecting said lever with the stud, and means for operatively connecting the lever with the pivot bolt of the automobile.

4. In a head light of the class described, a stud rigidly connected to the headlight, a guide on the automobile body adapted to receive and rotatably support the stud, a bracket on the frame of the automobile, a lever rotatably supported between its ends by said bracket, a second lever rigidly connected with the stud, a pin on the last named lever, a longitudinal slot in the first named lever, said pin extending through said slot, a third lever rigidly connected with the pivot bolt of the front wheel of the automobile, a pin on the last named lever, a second longitudinal slot in the first lever and adapted to receive the last named pin.

In witness whereof I affix my signature.

HERMANN FLACH.